(12) United States Patent
Zhou et al.

(10) Patent No.: US 11,886,327 B2
(45) Date of Patent: Jan. 30, 2024

(54) TRAINING A SYSTEM TO RECOGNIZE SCROLL BARS IN AN APPLICATION UNDER TEST

(71) Applicant: MICRO FOCUS LLC, Santa Clara, CA (US)

(72) Inventors: Gaoyang Zhou, Shanghai (CN); YunSheng Liu, Shanghai (CN); ChengZhe Xu, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/752,751

(22) Filed: May 24, 2022

(65) Prior Publication Data

US 2023/0385184 A1     Nov. 30, 2023

(51) Int. Cl.
| | |
|---|---|
| *G06F 11/36* | (2006.01) |
| *G06N 3/08* | (2023.01) |
| *G06F 3/04855* | (2022.01) |
| *G06F 18/22* | (2023.01) |
| *G06F 18/214* | (2023.01) |

(52) U.S. Cl.
CPC ...... *G06F 11/3684* (2013.01); *G06F 3/04855* (2013.01); *G06F 18/214* (2023.01); *G06F 18/22* (2023.01); *G06N 3/08* (2013.01)

(58) Field of Classification Search
CPC .......................... G06F 11/3684; G06F 3/04855
See application file for complete search history.

(56) References Cited

U.S. PATENT DOCUMENTS

| | | | | |
|---|---|---|---|---|
| 5,600,789 A | * | 2/1997 | Parker | G06K 13/0825 |
| | | | | 714/38.11 |
| 6,046,740 A | * | 4/2000 | LaRoche | G06V 30/422 |
| | | | | 715/764 |

* cited by examiner

*Primary Examiner* — Asher D Kells
(74) *Attorney, Agent, or Firm* — Sheridan Ross P.C.

(57) ABSTRACT

The design for modern graphical interfaces generated by an application under test (AUT) can take many forms. A codeless testing system reads the output generated by the AUT to identify components, however, scroll bars may be present but in a form that is not reliably identified. As a result, an AUT may comprise scrollable graphical elements that are not identified as such resulting in the performance of tests that are incomplete. By applying a middle button click event, an associated pointer changes form and reveals an associated graphical element to comprise a scrollable element. When the pointer change occurs, testing directed to the scrollable element is then included to perform a more complete testing of the features of the AUT.

21 Claims, 6 Drawing Sheets

| Skill | Proficiency |
|---|---|
| Java | 91% |
| Ruby | 88% |
| C# | |
| C++ | 75% |

| Skill | Proficiency |
|---|---|
| Java | 91% |
| Ruby | 88% |
| C# | 80% |
| C++ | 75% |

TRAINING A SYSTEM TO RECOGNIZE SCROLL BARS IN AN APPLICATION UNDER TEST

FIELD OF THE DISCLOSURE

The invention relates generally to systems and methods for configuring tests for an application under test and particularly to detecting if a scroll bar is present for testing in the application under test.

BACKGROUND

Codeless testing platforms, such as those utilizing artificial intelligence (AI), discover features of an application under test (AUT) and then selects or generates tests to be performed on the AUT. Due to system and artistic variations, certain graphical elements can be difficult to reliably detect. In particular, scroll bars. Scroll bars originally had a movable block that had a high-contrast compared to the path in which the block could travel. At the ends of the path were arrows. However, modern designs for scroll bars are much more varied and nuanced. In particular, some scroll bars are a visual slot without any arrows. Arrows, when included, can be small or artistically designed to make automated discovery unreliable as such features can be confused with other portions of a graphical user interface (GUI). Even the placement of arrows, when included, may be at locations other than the traditional ends of the scroll bar.

Figure 1:
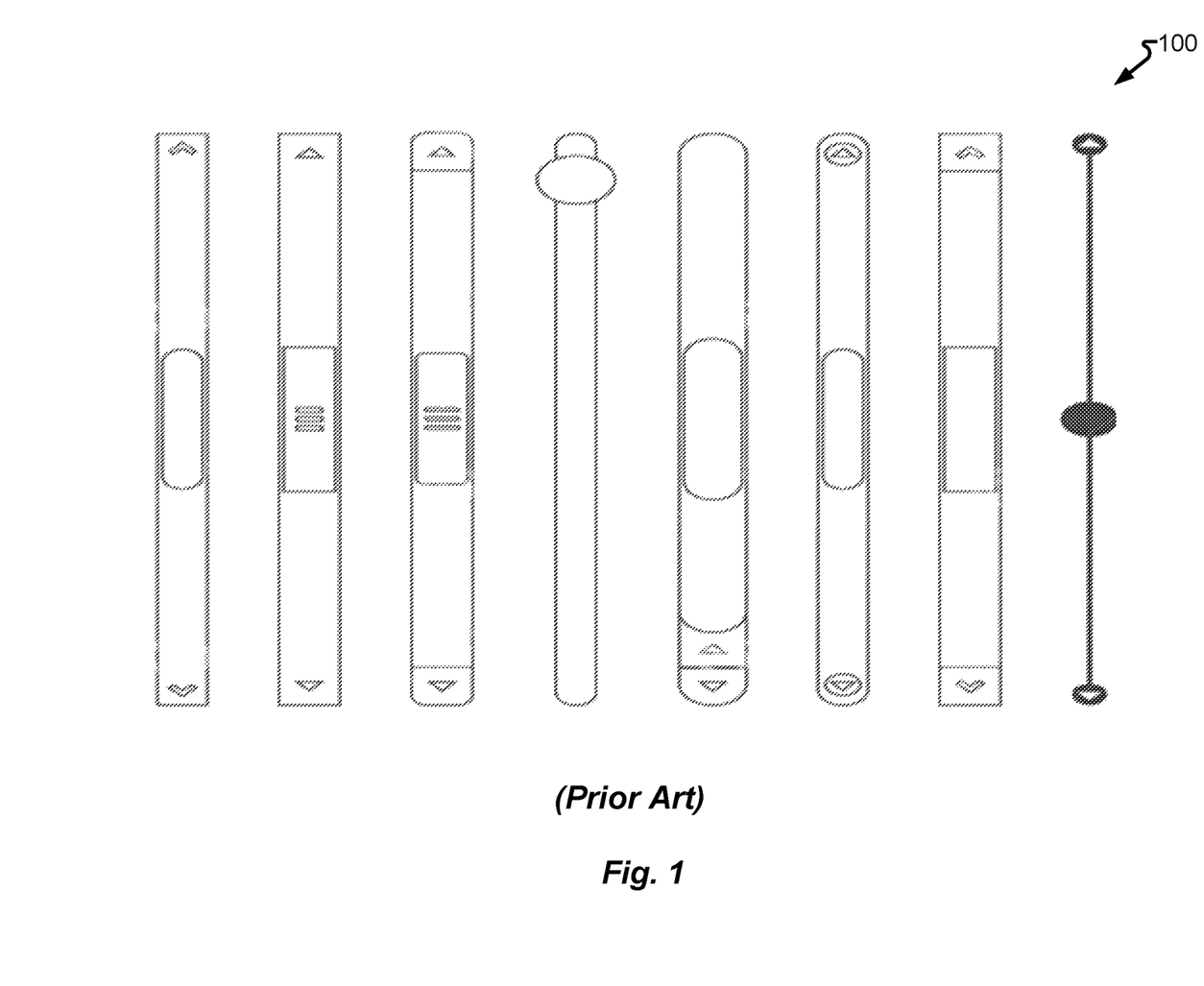
FIG. 1 depicts a number of scroll bars known in the prior art.

Examples of prior art scroll bars 100 are illustrated in FIG. 1. If the codeless testing platform fails to discover the presence of a scroll bar, then the corresponding scrollable element (e.g., dialog, window, scroll box, range/value entry, etc.) may not be tested with respect to content or operations affected by scrolling. If testing fails to discover a scroll bar and then omits testing the AUT with the corresponding tests, the AUT may have faults that are allowed to propagate to users outside of the testing environment which can be expensive and resource intensive to discover and remedy as well as inflict damage on other systems.

SUMMARY

These and other needs are addressed by the various embodiments and configurations of the present invention. The present invention can provide a number of advantages depending on the particular configuration. These and other advantages will be apparent from the disclosure of the invention(s) contained herein.

In one embodiment, an automatic testing system will apply a mouse middle button, which may be a wheel click event (e.g., "auxclick" in JavaScript, etc.). Before applying the middle button click event, an image of the application interface, which may comprise a browser displaying a web page, that includes the pointer, or optionally only the pointer, is captured and compared to a second image taken after the mouse middle button click. If the pointer remains unchanged, then no scroll bar is determined as being present and tests designed to test scrolling operations of the AUT are omitted. If the pointer does change shape, then a scroll bar is determined as being present and scroll bar specific tests are selected to test the AUT. Tests may include, but are not limited to, changing a value controlled by a scroll bar, selecting or interacting with a graphical element that may only be accessed upon scrolling, etc.

In one embodiment, a method for training a system to recognize scroll bars is disclosed, comprising: executing an application under test and wherein the system provides machine-generated inputs to a graphical user interface (GUI) of the application under test and observes outputs from the application under test via the GUI; capturing a first image of the GUI at a first time; after the first time, providing the GUI with a mouse input comprising a machine-generated mouse middle-button input; capturing a second image of the GUI at a second time after the mouse input; obtaining a difference image comprising a difference between the first image and the second image; determining whether the difference image comprises an altered mouse pointer; and upon determining that the difference image does comprise the altered mouse pointer, causing a test of a set of tests of the application under test in accordance with the GUI comprising a scroll bar.

In another embodiment, a system for training a test system to recognize scroll bars is disclosed, comprising: a processor to execute an application under test; an interface to receive machine-generated inputs from the test system and provide application under test graphical user interface (GUI) outputs to the test system; and wherein the processor executes the application under test and receives inputs from the test system and provides outputs to the test system via the interface; and wherein the processor: captures a first image of the GUI at a first time; after the first time, provides the GUI with a mouse input comprising a machine-generated mouse middle-button input; captures a second image of the GUI at a second time after the mouse input; obtains a difference image comprising a difference between the first image and the second image; determines whether the difference image comprises an altered mouse pointer; and upon determining that the difference image does comprise the altered mouse pointer, provides the test system with a datum associated with the GUI of the application under test comprising a scroll bar.

In another embodiment, a method for training a system to recognize scroll bars is disclosed, comprising: executing an application under test and wherein the system provides machine-generated inputs to a graphical user interface (GUI) of the application under test and observes outputs from the application under test via the GUI; determining whether the GUI comprises a scroll bar candidate; upon determining that the GUI does comprise the scroll bar candidate, capturing a first image of the GUI at a first time; after the first time, providing the GUI with a mouse input comprising a machine-generated mouse middle-button input; capturing a second image of the GUI at a second time after the mouse input; obtaining a difference image comprising a difference between the first image and the second image; determining whether the difference image comprises an altered mouse pointer; and upon determining that the difference image does comprise the altered mouse pointer, causing a test to be added to a set of tests of the application under test in accordance with the GUI comprising a scroll bar.

A system on a chip (SoC) including any one or more of the above embodiments or aspects of the embodiments described herein.

One or more means for performing any one or more of the above embodiments or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

FIG. 1 depicts number of scroll bars 100 known in the prior art. Number of scroll bars 100 illustrates a portion of scroll bars that may need to be detected in an application under test (AUT). Scroll bars may take many forms including, but not limited to, those illustrated by number of scroll bars 100. Codeless testing (e.g., tests selected by a trained neural network or similar artificial intelligence) determines features that are present and includes such features for testing and, similarly, tests are omitted for features not found. In some circumstances, an AUT may comprise a scrollable element but be absent a corresponding scroll bar.

In order for a testing system to know whether scroll bar testing should be included for a page or portion of a page (e.g., graphical element) of an application, which may include a web page or web element for presentation by a client application (e.g., web browser), a scroll bar must first be determined to be present. Scroll bars are graphical elements, sometimes referred to as a "slider", and may have various forms or representations. Generally, scroll bars have a movable element that may be selected and moved with a pointer to change the value of an element, scroll a display comprising items to selectively show some elements and not others, alter a view of a displayed object, and/or other purposes. Scroll bars may have arrows that, when selected, increment or decrement a value an element or position of a scrollable element items, depending on the arrow. If a particular representation of a scroll bar is new or rarely encountered, the codeless testing system may fail to detect the scroll bar. As a result tests based on the presence of a non-detected scroll bar may be erroneously omitted and the AUT may fail to be sufficiently tested and faults that would have been discovered, had the scroll bar been detected, may remain undetected.

A neural network, as is known in the art and in one embodiment, self-configures layers of logical nodes having an input and an output. If an output is below a self-determined threshold level, the output is omitted (i.e., the inputs are within the inactive response portion of a scale and provide no output). If the self-determined threshold level is above the threshold, an output is provided (i.e., the inputs are within the active response portion of a scale and provide an output). The particular placement of the active and inactive delineation is provided as a training step or steps. Multiple inputs into a node produce a multi-dimensional plane (e.g., hyperplane) to delineate a combination of inputs that are active or inactive.

Figure 2:
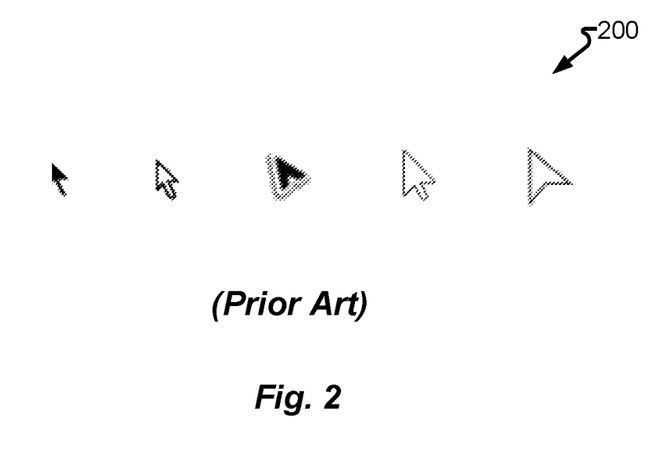
FIG. 2 depicts a number of pointers known in the prior art.

FIG. 2 depicts number of pointers 200 known in the prior art. Number of pointers 200 illustrates a portion of pointers (e.g., arrows, graphic, reticles, etc.) utilized to indicate a location on an AUT, such as to determine a particular graphical element of the AUT, that will be the target of a pointer action (e.g., hover or a triggered event such as a single or multiple click, press and hold, hold and release, hold and drag, etc., of a left button, center button, scroll wheel, right button, etc.). While the embodiments herein generally refer to a pointer as being located in accordance with signals received from a computer mouse (or, more simply, "mouse"), it should be appreciated that, in other embodiments, other pointing devices (e.g., track ball, touchpad, touch screen, etc.) may be utilized to determine the location of the pointer on an AUT and, alone or via another input device (e.g., keyboard button(s)), provide the pointer action.

Figure 3A:
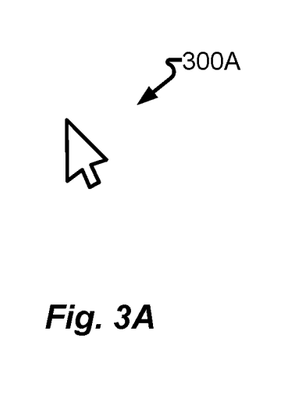
FIGS. 3A-3C depict a pointer in accordance with embodiments of the present disclosure.
Figure 3B:
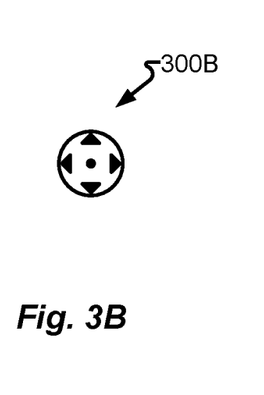
Figure 3C:
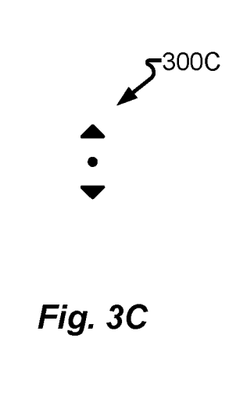

FIGS. 3A, 3B, 3C depict pointer 300 in accordance with embodiments of the present disclosure. Pointer 300, illustrated as pointer 300A in FIG. 3A and pointer 300B in FIG. 3B, depicts a transition resulting from a middle button click (whether the result of a human physically interacting with a mouse or an automated system generating a middle button click event). In another embodiment, a middle button comprises a clickable scroll wheel to generate a similar event (e.g., "auxclick") or, when a wheel click event is a discrete event from a middle button event, the wheel click event may be processed in a similar manner as a middle button click event.

In one embodiment, pointer 300A illustrates a pointer that has not received a middle button click event. Additionally or alternatively, pointer 300A illustrates a pointer that has received a middle button event but for which the target (not shown) is not responsive, such as when an AUT comprises no scrollable graphical elements co-located with pointer 300A or at any location within the graphical user interface of the AUT. Pointer 300B illustrates a pointer that has received a middle button event and is co-located with a graphical element that comprises a scrollable element. Pointer 300B illustrates a 4-way scroll, which may indicate that the co-located graphical element comprises two axes (commonly vertical and horizontal) of scrolling.

In another embodiment, pointer 300C illustrates a pointer that has received a middle button event and is co-located with a graphical element that comprises a scrollable element. Pointer 300C illustrates a 2-way scroll, which may indicate that co-located graphical element comprises a single axis of scrolling.

As will be described in more detail with respect to the embodiments that follow, an automated system may observe pointer 300 at a first time, such as when the form is that of pointer 300A, issue a middle button click, and observe the pointer 300 at a second time, such as to be one of pointer 300A (no change and therefore not co-located with a scrollable element), 300B (change and co-located with a 4-way scrollable element), or 300C (change and co-located with a 2-way scrollable element).

Figure 4A:
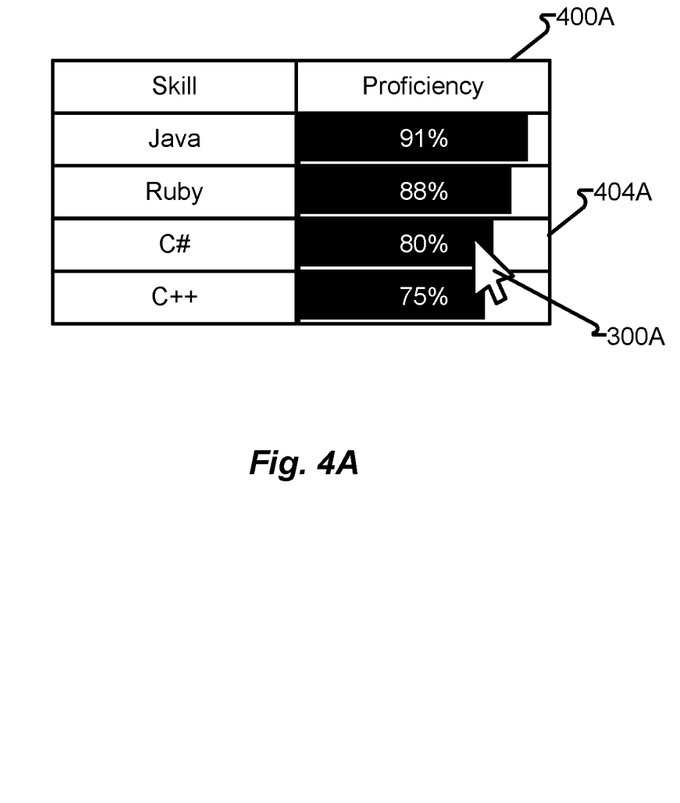
FIGS. 4A-4B depict a graphical user interface in accordance with embodiments of the present disclosure.
Figure 4B:
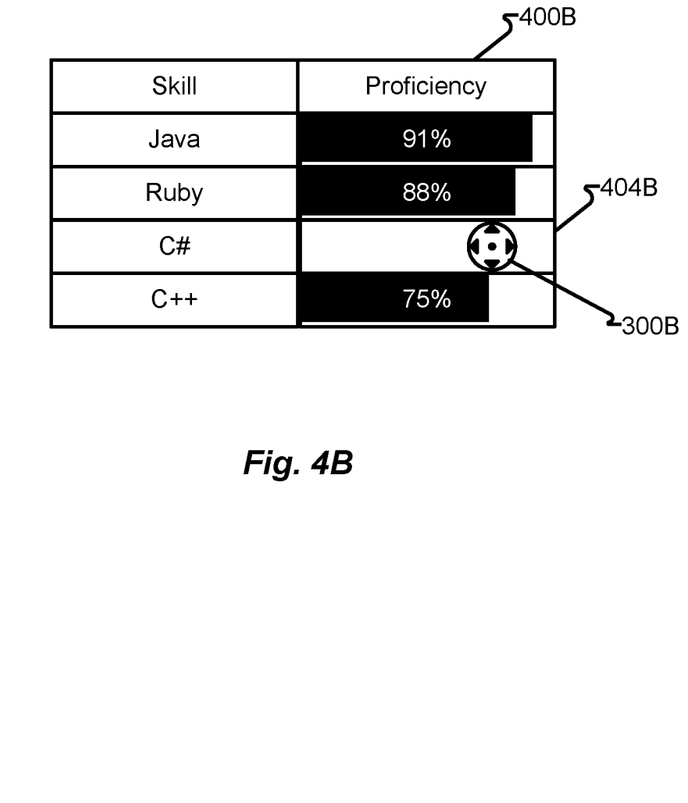

FIGS. 4A-4B depict graphical user interface 400 in accordance with embodiments of the present disclosure. In one embodiment, graphical user interface 400A is an output of an AUT. Pointer 300A has been located to cell 404A displaying a value. A middle button click signal is then provided to the AUT and, as a result, the AUT displays graphical user interface 400B of FIG. 4B. Graphical user interface 400B includes cell 404B which has been placed in an edit mode and pointer 300A has changed to pointer 300B. As a result, cell 404 is determined to have scrollable features, such as moving left to right to change a numerical value.

It should be appreciated that a scrollable element, when subject to a middle button click, will change but may not change predictably. For example, cell 404B may only be scrollable left and right, but pointer 300B results. While 404B may be determined to be scrollable, scrolling may be limited to only one axis or, had pointer 300C resulted, may indicate one or two axes of scrolling. Therefore, the AUT may be subject more, fewer, or different tests from those indicated by a resulting pointer (e.g., pointer 300B or pointer 300C) alone.

Figure 5:
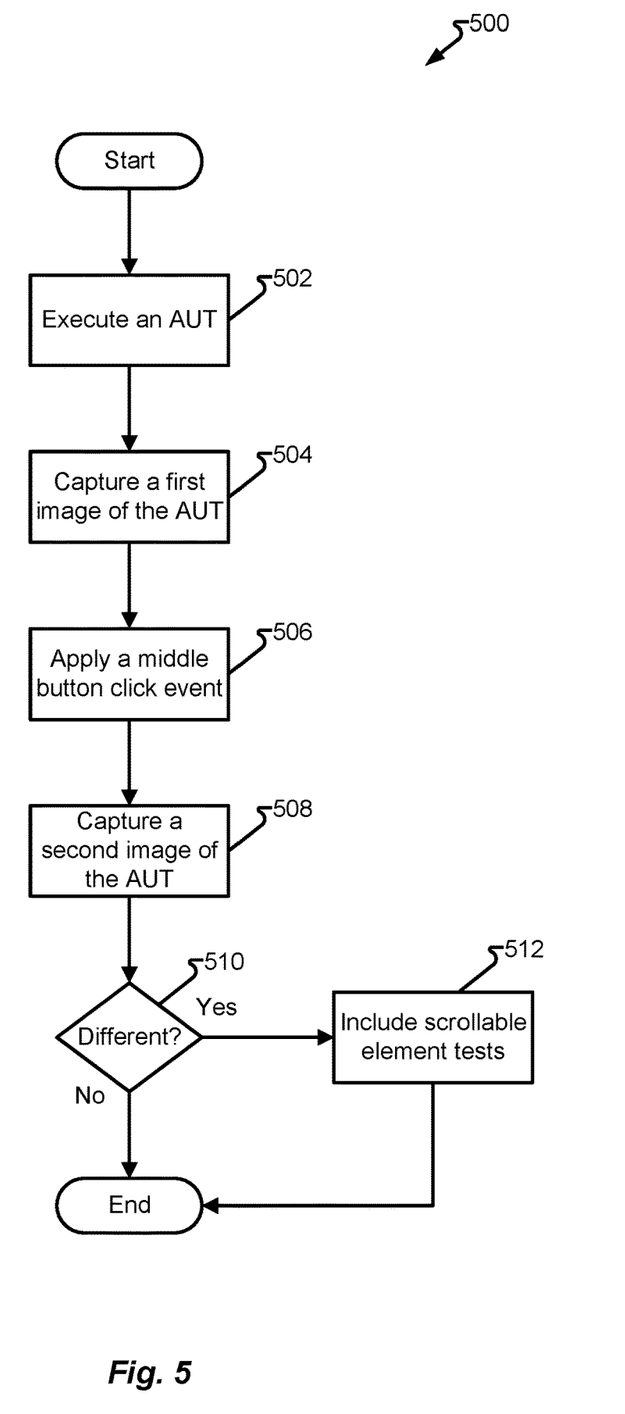
FIG. 5 depicts a process in accordance with embodiments of the present disclosure.

FIG. 5 depicts process 500 in accordance with embodiments of the present disclosure. In one embodiment, process 500 is embodied as machine-readable instructions maintained in a non-transitory storage that, when read by a machine such as a processor executing a codeless testing application to test an AUT, causes the machine to perform process 500.

Process 500 begins and executes an AUT in step 502. Step 504 captures a first image of the AUT. As used herein, capturing an image may comprise reading memory values, such as in a display buffer of a computer holding the output values of the AUT and which may or may not be connected to a display device. Accordingly, the processor may access the values held in memory and capture the values in order to capture the image.

Next, step 506 applies a middle button click event to the AUT. Step 506 may be performed at a specific location, such as one of a set of graphical display elements, a window, dialog, and/or another graphical element. Step 508 captures a second image of the AUT. It should be appreciated that steps 504 and step 508 may capture an image that is less than all of the AUT so long as the portion captured includes the pointer. Test 510 then determines if the images are different. Test 510 may specifically determine if a pointer image has transformed into a different image, such as a pointer (e.g., pointer 300B, pointer 300C) indicating a scrollable element, such as to exclude any resulting changes in the background (non-pointer) image. If test 510 is determined in the affirmative, then step 512 causes scrollable element testing to be added to tests to apply to the AUT. In one embodiment, if the difference between the first image and the second image is null, then test 510 is determined in the negative. However, if there is any difference, that is, the difference is not null, test 510 is determined in the affirmative. Additionally or alternatively, test 510 may determine that there is a non-null difference between the first image and the second image but the reason for the difference is other than a change in the pointer. In which case such a difference would be determined by test 510 to be no difference.

If test 510 is determined in the negative, then testing omits scrollable elements. Process 500 may then end; however, it should be appreciated by one of ordinary skill in the art that process 500 may be repeated for different graphical elements of the AUT in order to identify all graphical elements comprising scrollable elements.

Figure 6:
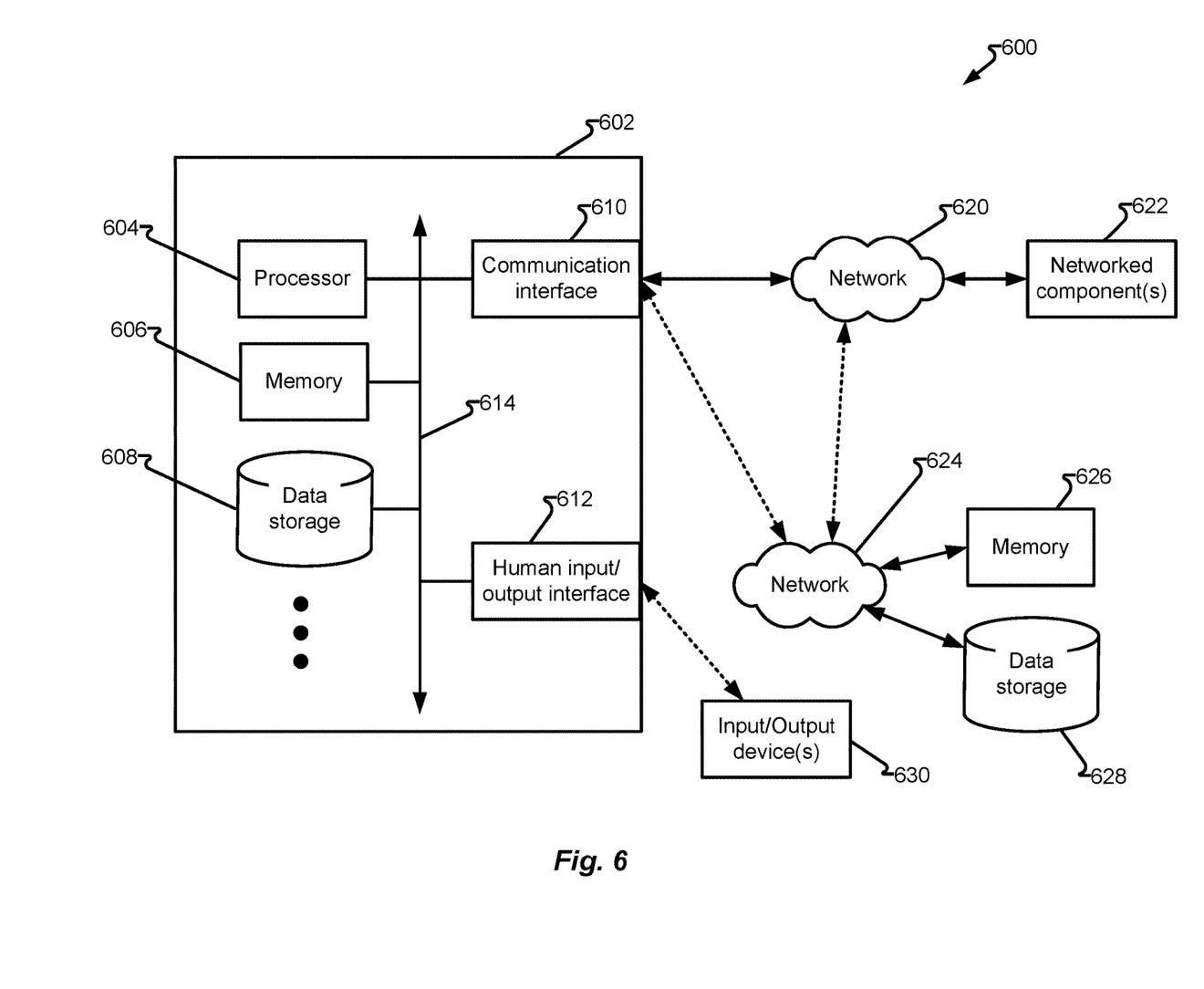
FIG. 6 depicts a device in a system in accordance with embodiments of the present disclosure.

FIG. 6 depicts device 602 in system 600 in accordance with embodiments of the present disclosure. In one embodiment, a device for testing AUTs may be embodied, in whole or in part, as device 602 comprising various components and connections to other components and/or systems. The components are variously embodied and may comprise processor 604. The term "processor," as used herein, refers exclusively to electronic hardware components comprising electrical circuitry with connections (e.g., pin-outs) to convey encoded electrical signals to and from the electrical circuitry. Processor 604 may comprise programmable logic functionality, such as determined, at least in part, from accessing machine-readable instructions maintained in a non-transitory data storage, which may be embodied as circuitry, on-chip read-only memory, memory 606, data storage 608, etc., that cause the processor 604 to perform the steps of the instructions. Processor 604 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 614, executes instructions, and outputs data, again such as via bus 614. In other embodiments, processor 604 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the VAX operating system and VAX machine instruction code set into Intel® 9xx chipset code to enable VAX-specific applications to execute on a virtual VAX processor), however, as those of ordinary skill understand, such virtual processors are applications executed by hardware, more specifically, the underlying electrical circuitry and other hardware of the processor (e.g., processor 604). Processor 604 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 604, device 602 may utilize memory 606 and/or data storage 608 for the storage of accessible data, such as instructions, values, etc. Communication interface 610 facilitates communication with components, such as processor 604 via bus 614 with components not directly accessible via bus 614, such as components accessible via network 620 and/or network 624. Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, speaker, microphone, still and/or video camera, etc. In another embodiment, communication interface 610 may comprise, or be comprised by, human input/output interface 612. Communication interface 610 may be configured to communicate directly with a networked component or utilize one or more networks, such as network 620 and/or network 624.

Network 620 may be a wired network (e.g., Ethernet), a wireless (e.g., WiFi, Bluetooth, cellular, etc.) network, or a combination thereof and enable device 602 to communicate with networked component(s) 622. In other embodiments, network 620 may be embodied, in whole or in part, as a telephony network (e.g., public switched telephone network (PSTN), private branch exchange (PBX), cellular telephony network, etc.)

Additionally or alternatively, one or more other networks may be utilized. For example, network 624 may represent a second network, which may facilitate communication with components utilized by device 602. For example, network 624 may be an internal network to a business entity or other organization whereby components are trusted (or at least more so) than networked components 622, which may be connected to network 620 comprising a public network (e.g., Internet) that may not be as trusted.

Components attached to network 624 may include memory 626, data storage 628, input/output device(s) 630, and/or other components that may be accessible to processor 604. For example, memory 626 and/or data storage 628 may supplement or supplant memory 606 and/or data storage 608 entirely or for a particular task or purpose. As another example, memory 626 and/or data storage 628 may be an external data repository (e.g., server farm, array, "cloud," etc.) and enable device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620. Each of memory 606, data storage 608, memory 626, data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, a switch, a port, or other communication component such that a particular output of processor 604 enables (or disables) input/output device 630, which may be associated with network 620 and/or network 624, to allow (or disallow) communications between two or more nodes on network 620 and/or network 624. One of ordinary skill in the art will appreciate that other communication equipment may be utilized in addition to or as an alternative to those described herein without departing from the scope of the embodiments.

As a result, and in one embodiment, process 604 may execute instructions to perform one or both of the AUT and the testing component. In another embodiment, networked component 622 may execute the AUT wherein process 604 executes the testing component. Memory values, such as those holding the graphical elements output by the AUT, may be read from memory 606 or a memory of network component 622. In another embodiment, the outputs from the AUT are maintained in memory 626 and/or 628.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method for training a system to recognize scroll bars, comprising:
    executing an application under test and wherein the system provides machine-generated inputs to a graphical user interface (GUI) of the application under test and observes outputs from the application under test via the GUI;
    capturing a first image of the GUI at a first time;
    after the first time, providing the GUI with a mouse input comprising a machine-generated mouse middle-button input;
    capturing a second image of the GUI at a second time after the mouse input;
    obtaining a difference image comprising a difference between the first image and the second image;
    determining whether the difference image comprises an altered mouse pointer; and
    upon determining that the difference image does comprise the altered mouse pointer, causing a test of a set of tests of the application under test in accordance with the GUI comprising a scroll bar.

2. The method of claim 1, wherein upon determining the difference image does not comprise the altered mouse pointer, performing at least one of removing the test from the set of tests or omitting causing the test to be added to the set of tests.

3. The method of claim 1, wherein determining that the difference image comprises the altered mouse pointer comprises determining the difference image is not null.

4. The method of claim 1, wherein the difference image is not null at a location of a mouse pointer on the GUI and excludes portions of the difference image not at the location of the mouse pointer on the GUI.

5. The method of claim 1, wherein determining whether the difference image comprises the altered mouse pointer comprises determining whether the difference image comprises a difference greater than a previously determined threshold.

6. The method of claim 1, further comprising:
analyzing the first image of the GUI analyzed to determine whether a scroll bar candidate is present; and
upon determining that the scroll bar candidate is not present, performing at least one of removing the test from the set of tests or omitting causing the test to be added to the set of tests.

7. The method of claim 1, wherein:
the first image comprises an image of an entirety of a mouse pointer and less than all of the GUI; and
the second image comprises an image of one of either the entirety of the mouse pointer or the entirety of the altered mouse pointer and less than all of the GUI.

8. The method of claim 1, wherein adding the test to the set of tests comprises setting an indicator value to indicate a presence of the scroll bar, wherein the system, upon reading the indicator value, performs at least one scroll bar operation on the application under test.

9. A system for training a test system to recognize scroll bars, comprising:
a processor to execute an application under test;
an interface to receive machine-generated inputs from the test system and provide application under test graphical user interface (GUI) outputs to the test system; and
wherein the processor executes the application under test and receives inputs from the test system and provides outputs to the test system via the interface; and
wherein the processor:
captures a first image of the GUI at a first time;
after the first time, provides the GUI with a mouse input comprising a machine-generated mouse middle-button input;
captures a second image of the GUI at a second time after the mouse input;
obtains a difference image comprising a difference between the first image and the second image;
determines whether the difference image comprises an altered mouse pointer; and
upon determining that the difference image does comprise the altered mouse pointer, provides the test system with a datum associated with the GUI of the application under test comprising a scroll bar.

10. The system of claim 9, wherein the processor, upon determining the difference image does not comprise the altered mouse pointer, performs at least one of providing the datum associated with the GUI of the application under test not comprising the scroll bar or removing the datum associated with the GUI of the application under test comprising the scroll bar.

11. The system of claim 9, wherein the processor determines that the difference image comprises the altered mouse pointer comprises the processor determining the difference image is not null.

12. The system of claim 9, wherein the difference image is not null at a location of a mouse pointer on the GUI and excludes portions of the difference image not at the location of the mouse pointer on the GUI.

13. The system of claim 9, wherein the processor determines whether the difference image comprises the altered mouse pointer comprising the processor determining whether the difference image comprises a difference greater than a previously determined threshold.

14. The system of claim 9, further comprising:
the processor analyzing the first image of the GUI analyzed to determine whether a scroll bar candidate is present; and
upon determining that the scroll bar candidate is not present, the processor performs at least one of providing the datum associated with the GUI of the application under test not comprising the scroll bar or removing the datum associated with the GUI of the application under test comprising the scroll bar.

15. The system of claim 9, wherein:
the first image comprises an image of an entirety of a mouse pointer and less than all of the GUI; and
the second image comprises an image of one of either the entirety of the mouse pointer or the entirety of the altered mouse pointer and less than all of the GUI.

16. A method for training a system to recognize scroll bars, comprising:
executing an application under test and wherein the system provides machine-generated inputs to a graphical user interface (GUI) of the application under test and observes outputs from the application under test via the GUI;
determining whether the GUI comprises a scroll bar candidate;
upon determining that the GUI does comprise the scroll bar candidate, capturing a first image of the GUI at a first time;
after the first time, providing the GUI with a mouse input comprising a machine-generated mouse middle-button input;
capturing a second image of the GUI at a second time after the mouse input;
obtaining a difference image comprising a difference between the first image and the second image;
determining whether the difference image comprises an altered mouse pointer; and
upon determining that the difference image does comprise the altered mouse pointer, causing a test to be added to a set of tests of the application under test in accordance with the GUI comprising a scroll bar.

17. The method of claim 16, wherein:
upon determining at least one of (i) the difference image does not comprise the altered mouse pointer or (ii) the GUI does not comprise a scroll bar candidate, performing at least one of removing the test from the set of tests or omitting adding the test to the set of tests.

18. The method of claim 16, wherein determining that the difference image comprises the altered mouse pointer comprises determining the difference image is not null.

19. The method of claim 16, wherein the difference image is not null at a location of a mouse pointer on the GUI and excludes portions of the difference image not at the location of the mouse pointer on the GUI.

20. The method of claim 16, wherein determining whether the difference image comprises the altered mouse pointer comprises determining whether the difference image comprises a difference greater than a previously determined threshold.

21. The method of claim 16 wherein determining whether the GUI comprises a scroll bar candidate comprises providing the GUI to a neural network trained to recognize scroll bars and receiving a decision therefrom.

* * * * *